June 10, 1930.  J. B. GALBRAITH  1,763,299
CUTTER
Filed Aug. 23, 1927
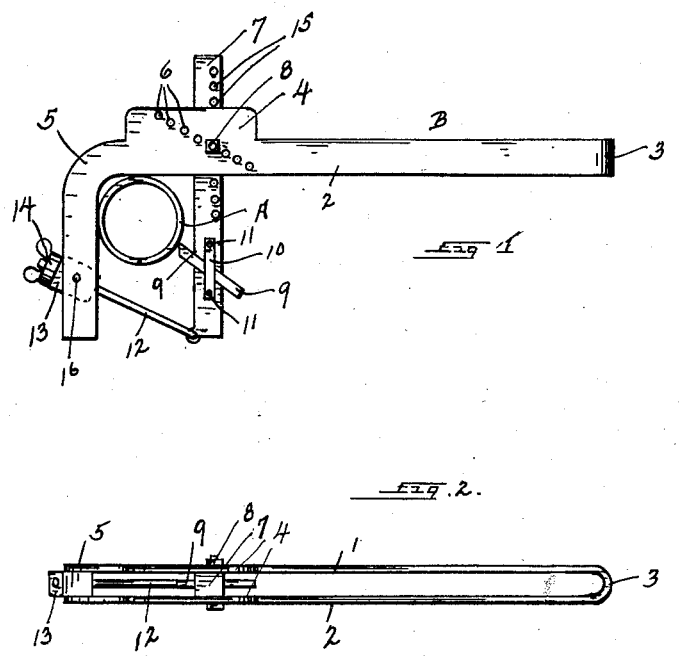
Inventor
Joseph B Galbraith
By R. M. Thomas
Attorney Patented June 10, 1930

1,763,299

UNITED STATES PATENT OFFICE

JOSEPH B. GALBRAITH, OF KAYSVILLE, UTAH

CUTTER

Application filed August 23, 1927. Serial No. 214,831.

My invention relates to cutters and has for its object to provide a new and efficient cutter for cutting off pipes and other objects when turned by a lathe or chuck.

A further object is to provide a new and economical cutter for severing pipes which will be quicker and more efficient in cutting off the section of pipe and which will eliminate the danger of breaking the tools in making the cut.

These objects I accomplish with the device illustrated in the accompanying drawings, in which similar numerals and letters of reference indicate like parts throughout the several views and as described in the specification forming a part of this application and pointed out in the appended claim.

In the drawings, in which I have shown the best and most preferred manner of building my invention, Figure 1 is a side view of the device cutting off a pipe. Figure 2 is a plan view of the cutter, with the thumb screw removed.

In the drawings I have shown the pipe as A and the handle B as made of a bar of metal bent back upon itself to form two spaced apart bars 1 and 2 bent at 3. The said bars are made wider, as at 4 and have an angled bend 5 in each of them, as shown in Figure 1. Holes 6 are provided in the widened portion 4 to regulate the cutting of the pipe and to provide for large and small pipes. A cutter bar 7 is suspended from the said holes 6 by the bolt 8 and has a cutting tool 9 placed therethrough at an angle thereto. The said tool 9 is secured adjustably in the said bar 7 by the clamp 10 and the bolts 11. A threaded eye bolt 12 is secured pivotally to the lower end of the said bar 7 and a guide 13 is provided between the two free ends of the said bars 1 and 2 and pivoted therebetween on the pine 16 and through which guide the said bolt 12 is passed and a thumb screw or a nut 14 is screwed onto the end of the said bolt to draw the cutter bar 7 to the work.

It will be obvious that the eye bolt and its parts might be placed back of the bar 7 and force it to its work by pressure, rather than drawing it to the work as shown, without departing from the spirit of the invention and from the scope of the claim, and the device may be rotated by hand to do the cutting.

The operation of my device is as follows:

To cut a piece of pipe the bars 1 and 2 are hung over the pipe to be cut and the cutter bar 7 is placed in the correct position to make the cut by varying the bolt 8 in the holes 6 and also in holes 15 provided in the cutter bar. The cutting tool is placed against the work and the work rotated by any means; as the tool cuts into the work the thumb screw 14 is turned on the bolt 12 and the cutter tool is forced into the work, cutting the pipe.

Having thus described my invention, I desire to secure by Letters Patent and claim:—

In a cutter the combination of a piece of metal bent back upon itself to form a handle; a cutting bar suspended from said handle near one end thereof; a cutting tool set in said bar at an angle thereto; an eye bolt secured to the lower end of said cutter bar to draw said cutter bar to the work; and a thumb nut on said eye bolt.

In testimony whereof I have affixed my signature.

JOSEPH B. GALBRAITH.